US012709197B2

(12) United States Patent
Petit et al.

(10) Patent No.: US 12,709,197 B2
(45) Date of Patent: Aug. 18, 2026

(54) SEAT RUNNER WITH POSITION SENSOR

(71) Applicant: FAURECIA SIÈGES D'AUTOMOBILE, Nanterre (FR)

(72) Inventors: Fabrice Petit, Saint Georges Des Groseillers (FR); Guillaume Petot Guillaume, La Ferriere Aux Etangs (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 249 days.

(21) Appl. No.: 18/719,580

(22) PCT Filed: Dec. 16, 2022

(86) PCT No.: PCT/EP2022/086342
§ 371 (c)(1),
(2) Date: Jun. 13, 2024

(87) PCT Pub. No.: WO2023/111263
PCT Pub. Date: Jun. 22, 2023

(65) Prior Publication Data

US 2025/0135964 A1 May 1, 2025

(51) Int. Cl.
*B60N 2/07* (2006.01)
*B60N 2/02* (2006.01)

(52) U.S. Cl.
CPC ......... *B60N 2/0705* (2013.01); *B60N 2/0272* (2023.08); *B60N 2/0722* (2013.01)

(58) Field of Classification Search
CPC ...... B60N 2/07; B60N 2/0705; B60N 2/0272; B60N 2/0702; B60N 2/0722;
(Continued)

(56) References Cited

U.S. PATENT DOCUMENTS 7,195,261 B2 * 3/2007 Yoshida ............ B60R 21/01554 324/207.21
2005/0021207 A1 * 1/2005 Endo .................... B60N 2/0031 701/49
(Continued)

FOREIGN PATENT DOCUMENTS

DE 102013213798 1/2015

OTHER PUBLICATIONS

International Search Report and Written Opinion for PCT/EP2022/086342 dated Mar. 31, 2023.

*Primary Examiner* — Gregory A Blankenship
(74) *Attorney, Agent, or Firm* — Barnes & Thornburg LLP

(57) ABSTRACT

Vehicle seat runner, the runner extending principally along a longitudinal direction, and comprising:
- a female profiled section configured to be fixed to a vehicle floor,
- a male profiled section mounted to slide with respect to the female profiled section along the longitudinal direction, an internal runner space being delimited between the male profiled section and the female profiled section, the male profiled section comprising, along the longitudinal direction, a first end and a second end and having a web and first and second side walls, the web being continued downwards by the first and second side walls,
- a position sensor fixed on the male profiled section, and configured so as to determine the position of the male profiled section with respect to the female profiled section, the position sensor additionally comprising a flexible portion with a fastening portion for fastening the flexible portion to the male profiled section, the fastening portion being configured to fasten in a second (Continued)

opening arranged on a second wall of the first and second side walls, opposite the first wall having the first opening, the position sensor being configured to be joined to the runner by longitudinal assembly, during which the position sensor is inserted into the internal runner space via one of the first and second ends of the male profiled section.

12 Claims, 11 Drawing Sheets

(58) Field of Classification Search
CPC .... B60N 2/0715; B60N 2/072; B60N 2/0735; B60N 2/067; B60N 2/06; B60R 21/01554
See application file for complete search history.

(56) References Cited

U.S. PATENT DOCUMENTS

| | | | | |
|---|---|---|---|---|
| 2007/0069100 | A1 | 3/2007 | Schuler et al. | |
| 2022/0097570 | A1* | 3/2022 | Petot | B60N 2/0272 |
| 2022/0097571 | A1* | 3/2022 | Petit | B60N 2/0276 |
| 2022/0212571 | A1* | 7/2022 | Plancon | B60N 2/0272 |
| 2022/0396177 | A1* | 12/2022 | Jablonski | B60N 2/0244 |
| 2025/0001909 | A1* | 1/2025 | Petit | B60R 16/027 |
| 2025/0135964 | A1* | 5/2025 | Petit | B60N 2/0722 |

* cited by examiner

SEAT RUNNER WITH POSITION SENSOR

CROSS REFERENCE TO RELATED APPLICATIONS

This application is a U.S. national stage application under 35 U.S.C. § 371(b) of International Application No. PCT/EP2022/086342 filed Dec. 16, 2022, which claims priority to the France Patent Application No. 2113639 filed on Dec. 16, 2021, the disclosures of both of which are hereby expressly incorporated by reference in their entirety.

The present invention relates to a runner, in particular for a motor vehicle seat, as well as to a method for manufacturing such a runner and to a vehicle seat comprising such a runner.

TECHNICAL FIELD

More particularly, the invention relates to a runner for a vehicle seat comprising a female profiled section and a male profiled section mounted to slide relative to one another, and a position sensor attached to the male profiled section, in an internal runner space.

PRIOR ART

A vehicle seat slide having a female profiled section and a male profiled section, mounted to slide with respect to the female profiled section along the longitudinal direction of the runner, is known for example from document U.S. Pat. No. 6,053,529 A. This runner also has a position sensor configured to determine the position of the female profiled section relative to the male profiled section, cooperating with a substantially L-shaped protrusion, provided on an outer side wall of the female profiled section, projecting towards the outside of said female profiled section. The position sensor, in this case a magnetic field sensor, is attached to a support, provided on an outer side wall of the male profiled section, protruding towards the outside of said male profiled section, and provided to internally receive said L-shaped protrusion, so that the position sensor is located opposite said L-shaped protrusion. The magnetic field, or its variation, measured by the position sensor makes it possible to know the position of the female profiled section relative to the male profiled section along the longitudinal direction of the runner, and therefore of the seat intended to be attached to the floor of a vehicle via said runner, and for example in order to be able to manage the deployment of a passenger restraint system, such as an airbag for example.

Such a runner has several drawbacks.

Firstly, the design of the position sensor requiring cooperation with said L-shaped protrusion attached outwardly protruding on the female profiled section increases the bulk of the runner, particularly in its transverse direction.

Also, such a design of the position sensor, in particular with the need to co-operate with said L-shaped protrusion, attached outwardly protruding on the female profiled section of the runner, makes the design of the runner more complex and substantially increases its cost.

In addition, since the position sensor requires the use of elements protruding outwardly from the female profiled section, it risks being damaged by other elements of the vehicle on which the runner is attached, such as for example the feet of an occupant of the vehicle, and might no longer be able to function, which may represent a high risk to the safety of the occupants of a vehicle wherein a seat is attached to the floor via said runner.

Finally, such a runner is lengthy and complex to manufacture, which also substantially increases its cost.

Technical Problem

The invention improves the situation.

The objective of the present invention is therefore to propose a runner for a vehicle seat extending mainly in a longitudinal direction and having a position sensor with simplified design, reduced bulk, and lower cost. The entire position sensor is also protected from the outside. The dimensions of the sensor may also be optimized so that the sensor is compatible with manual or electrically controlled runners.

Another objective of the present invention is to propose such a runner that improves safety for the occupants of a vehicle.

Another objective of the present invention is to propose such a runner that is quick and simple to manufacture.

Thus, the invention relates to a runner for a vehicle seat, the runner extending mainly in a longitudinal direction, and comprising:

- a female profiled section configured to be fixed to a vehicle floor,
- a male profiled section mounted to slide with respect to the female profiled section in the longitudinal direction, an internal runner space being delimited between the male profiled section and the female profiled section, the male profiled section comprising, in the longitudinal direction, a first end, and a second end, and having a web and first and second side walls, the web extending longitudinally substantially in the longitudinal direction and transversely in the transverse direction, said web being continued downwards by the first and second side walls,
- a position sensor, attached to the male profiled section, in the internal runner space, and configured so as to determine the position of the male profiled section with respect to the female profiled section, at least in the longitudinal direction of the runner, the position sensor comprising a sensor body and a sensitive portion extending projecting from the sensor body, the sensitive portion being arranged through a first opening of a first one of the first and second side walls, the position sensor further comprising a flexible portion with a fastening portion for fastening the flexible portion to the male profiled section, the flexible portion being configured to elastically stress the sensitive portion through the first opening towards the outside in a deployed position of the sensitive portion when the female profiled section is not opposite the first opening, said sensitive portion being configured to come into contact with the female profiled section by causing its retraction toward the internal runner space in a retracted position, the fastening portion being configured to fasten in a second opening arranged on a second wall among the first and second side walls, opposite the first wall having the first opening, the position sensor being configured to be joined to the runner by longitudinal assembly, during which the position sensor is inserted into the internal runner space by one of the first or second ends of the male profiled section.

The features disclosed in the following paragraphs may optionally be implemented. They can be implemented independently of one another or in combination with one another:

the male profiled section may comprise an inverted U-shaped mouth delimited by a field of the male profiled section, the position sensor being inserted into the internal runner space in the longitudinal direction to the runner through the opening to secure the position sensor inside the male profiled section until the sensitive portion is engaged in the first opening and the fastening portion in the second opening;

the sensor body may extend mainly and substantially in the longitudinal direction and the sensitive portion protrudes from the sensor body in the transverse direction;

the second opening may be a notch opening onto the field of the male profiled section having a upper notch edge and a lower notch edge, and wherein the fastening portion comprises a fastening portion body with a first opposite groove and a second groove configured to cooperate respectively with the upper notch edge and the lower notch edge by guiding the longitudinal assembly;

the first one of the first and second side walls may further have at least one guide opening, wherein the position sensor comprises at least one pin cooperating with the second opening, to block the longitudinal movement of the position sensor in the runner volume over the entire transverse stroke of the position sensor between the deployed position and the retracted position of the sensitive portion.;

on the one hand, the sensor body may have a connection interface provided to receive one or more cables, in particular electrical cables, for their connection to the position sensor and, on the other hand, the flexible portion may comprise a first flexible portion end and a second flexible portion end, the first flexible portion end being attached to the sensor body and comprising at its second flexible portion end the fastening portion, wherein the fastening portion is movable between an insertion position wherein the fastening portion is arranged in line with the connection interface of the sensor body along the transverse direction, and a fastening position wherein the fastening portion is moved away from the sensor body in the transverse direction, and configured so that the fastening portion forms an obstacle preventing the connection of the cables to the connection interface in the case where the position sensor is inserted into the internal runner space without the fastening portion engaging in the second opening and/or without the sensitive portion engaging in the first opening;

the sensor body comprises a protrusion, directed toward a lower face of the web of the male profiled section, configured to cooperate with the lower face by opposing the tilting of the sensor body induced by the sensitive portion coming into contact with the female profiled section;

the runner may further comprise a screw adjustment mechanism comprising a screw extending into the internal runner space oriented in the longitudinal direction, rigidly connected to the female profiled section, a casing integral with the male profiled section, housing a nut screwed onto the screw, the nut being mounted rotatably relative to the casing, wherein the position sensor is arranged against a lower face of the web and over the screw adjustment mechanism to allow the sliding of the male profiled section in the female profiled section, without the screw adjustment mechanism coming into contact with the position sensor;

the screw can be integral with the female profiled section via at least one support, with a bulk greater than the bulk of the screw, the position sensor being configured to pass over the support during the sliding of the male profiled section relative to the female profiled section.

The invention also relates to a method for manufacturing a runner as described above, comprising:

a) providing the position sensor, b) inserting the position sensor into the internal runner space by one of the first or second ends of the male profiled section, in the longitudinal direction of the runner through an inverted U-shaped mouth delimited by a field of the male profiled section to attach it to the inside of the male profiled section until the sensitive portion is engaged in the first opening and the fastening portion is engaged in the second opening.

The method may further comprise, during b):

engaging the fastening portion with guidance of the fastening portion into the notch during the insertion of the position sensor in the longitudinal direction, the second end of the male profiled section terminating in a free end, and the second opening being a notch opening onto the edge of the male profiled section.

The invention lastly relates to a vehicle seat comprising a runner as described above.

BRIEF DESCRIPTION OF THE DRAWINGS

Other features, details and advantages will become apparent on reading the following detailed description and the analysis of the appended drawings, wherein.

DESCRIPTION OF THE EMBODIMENTS

Throughout the present application:

the longitudinal direction X of the runner corresponds to the direction in which the male profiled section slides relative to the female profiled section, as can be seen in the figures, the vertical direction Z of the runner corresponds to the direction, perpendicular to the longitudinal direction X, substantially perpendicular to the plane of the floor of the vehicle to which the runner is provided, as can be seen in the figures.

the transverse direction Y of the runner corresponds to the direction perpendicular to the longitudinal direction X and to the vertical direction Z of the runner, as can be seen in the figures.

An axis is defined as a straight line in a determined direction of the runner. For example, a longitudinal axis is an axis along the longitudinal direction X of the runner.

Also front and rear are understood as being along said longitudinal direction X of the runner.

Likewise, upper and lower are understood in the vertical direction Z of the runner, with an orientation from the runner profile provided to be attached to the floor of the vehicle toward the profiled section provided to be attached to the squab of a seat.

Finally, throughout the present application, substantially longitudinal, transverse or vertical means refer to an orientation relative to the longitudinal direction, the vertical direction or the transverse direction, with an angle of less than 30°, which may advantageously be zero.

Likewise, substantially parallel refers to an orientation relative to a given element with an angle of less than 30°, which can advantageously be zero.

Figure 2:
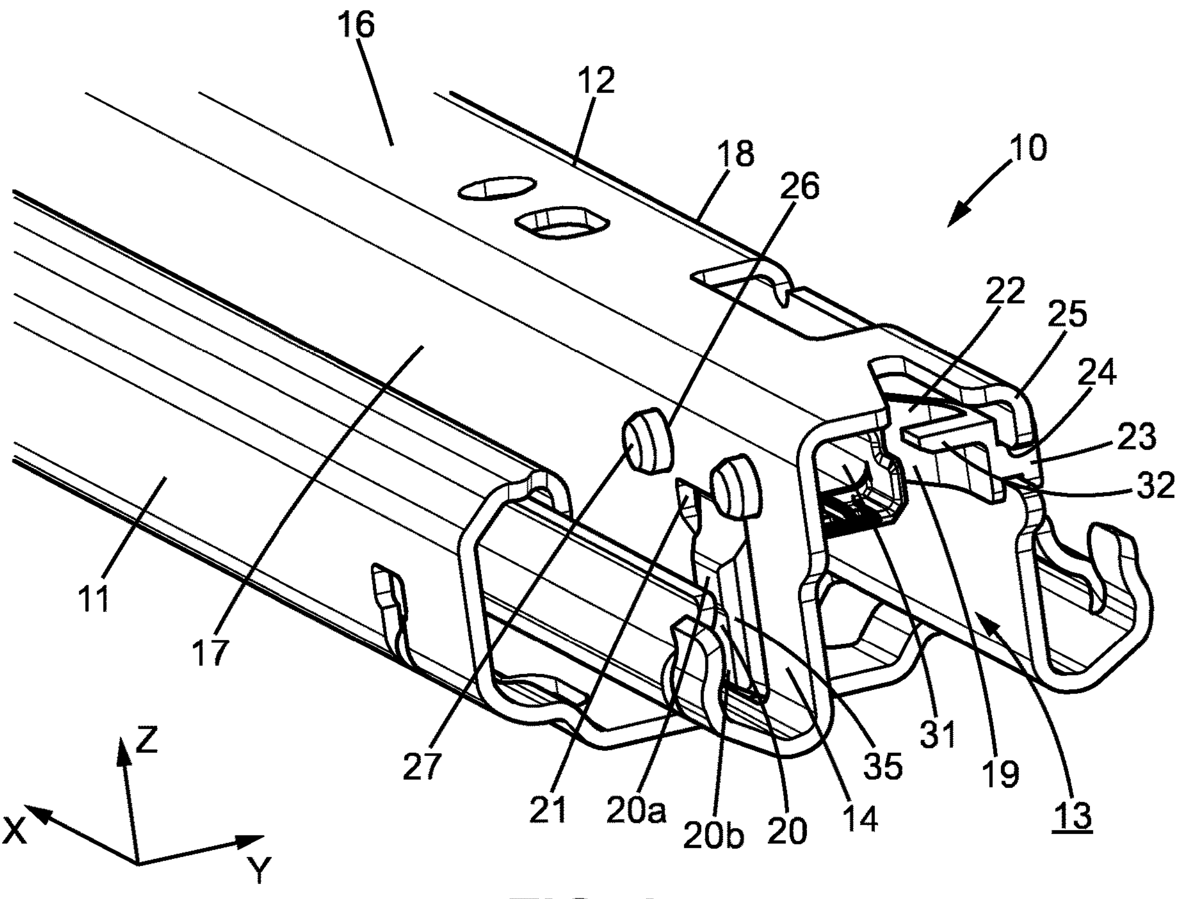
FIG. 2 is a side perspective view of a runner according to FIG. 1.
Figure 5:
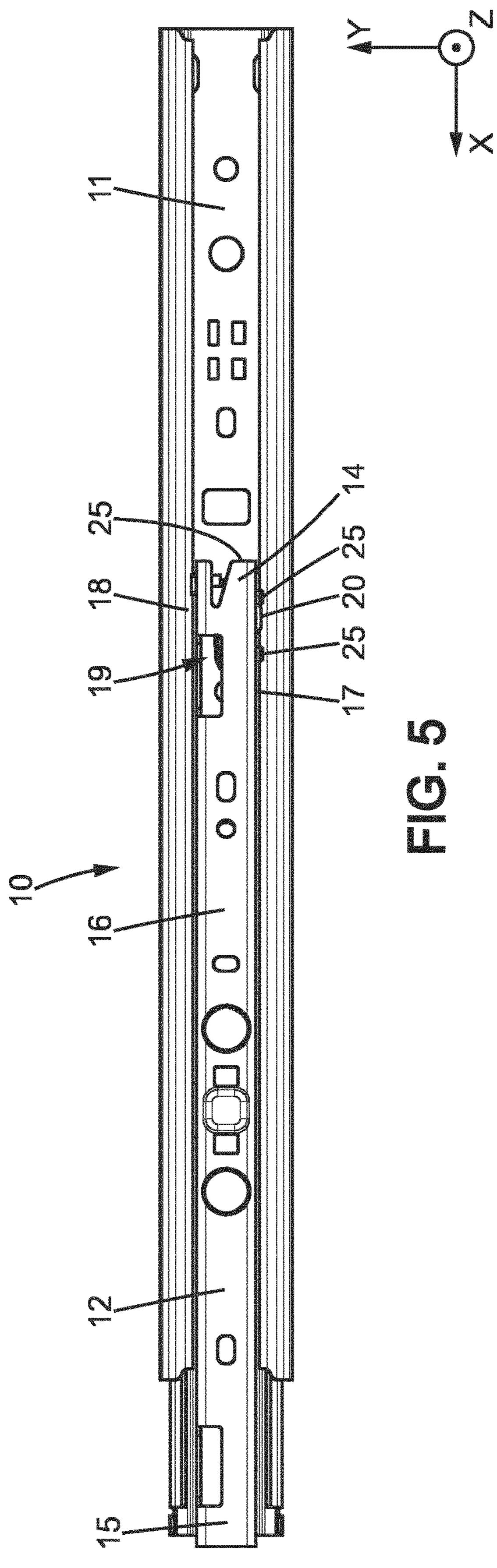
FIG. 5 is an upper view of the runner, the rear end of the male profiled section being engaged in the female profiled section.

The present description relates to a runner 10 for a vehicle seat. The runner mainly comprises a female profiled section 11 and a male profiled section 12. The male profiled section 12 is mounted to slide with respect to the female profiled section 11, in the longitudinal direction X. The female profiled section 11 is provided to be attached to a vehicle floor, while the male profiled section 12 can be connected to a seat, and in particular to the squab of a seat. The slide 10 can be provided so that the movement of the male profiled section 12 relative to the female profiled section 11 in the longitudinal direction X of the runner 10 is driven manually and/or via a drive means. To this end, FIG. 2 shows a rear (or recessed) position of the male profiled section 12 relative to the female profiled section 11, corresponding to a rear position of the vehicle seat, and FIG. 5 shows an advanced (or engaged) position of the male profiled section 12 relative to the female profiled section 11, corresponding to an advanced position of the vehicle seat. In the position of FIG. 5, the rear end 14 (or first end) of the male profiled section 12 is engaged in the female profiled section 11.

The female profiled section 11 can advantageously be made essentially of metallic material, and likewise for the male profiled section 12.

The male profiled section 12 extends mainly longitudinally, along the longitudinal direction. More specifically, the male profiled section 12 extends between a rear end 14 and a front end 15 (or second end). The rear end 14 ends with an edge 25, that is a border of material terminating the male profiled section 12. The male profiled section 12 comprises a web 16, a first side wall 17 and a second side wall 18. The web 16 extends substantially longitudinally, along the longitudinal direction X, and transversely in the transverse direction Y. The first side wall 17 extends longitudinally, in the longitudinal direction X and perpendicular to the web 16, that is in the vertical direction Z. The second side wall 18 also extends longitudinally, along the longitudinal direction X and perpendicular to the web 16, that is, in the vertical direction vertical direction Z, on the side opposite the first side wall 17. In other words, the web 16 extends vertically downward, on either side, by the first side wall 17 and the second side wall 18. The web 16, the first side wall 17 and the second side wall 18 thus form, for example, a section profile, in the transverse direction transverse direction Y, in the shape of an inverted U. The male profiled section 12 thus defines an internal runner space 13, delimited by the web 16, the first side wall 17 and the second side wall 18.

Figure 8:
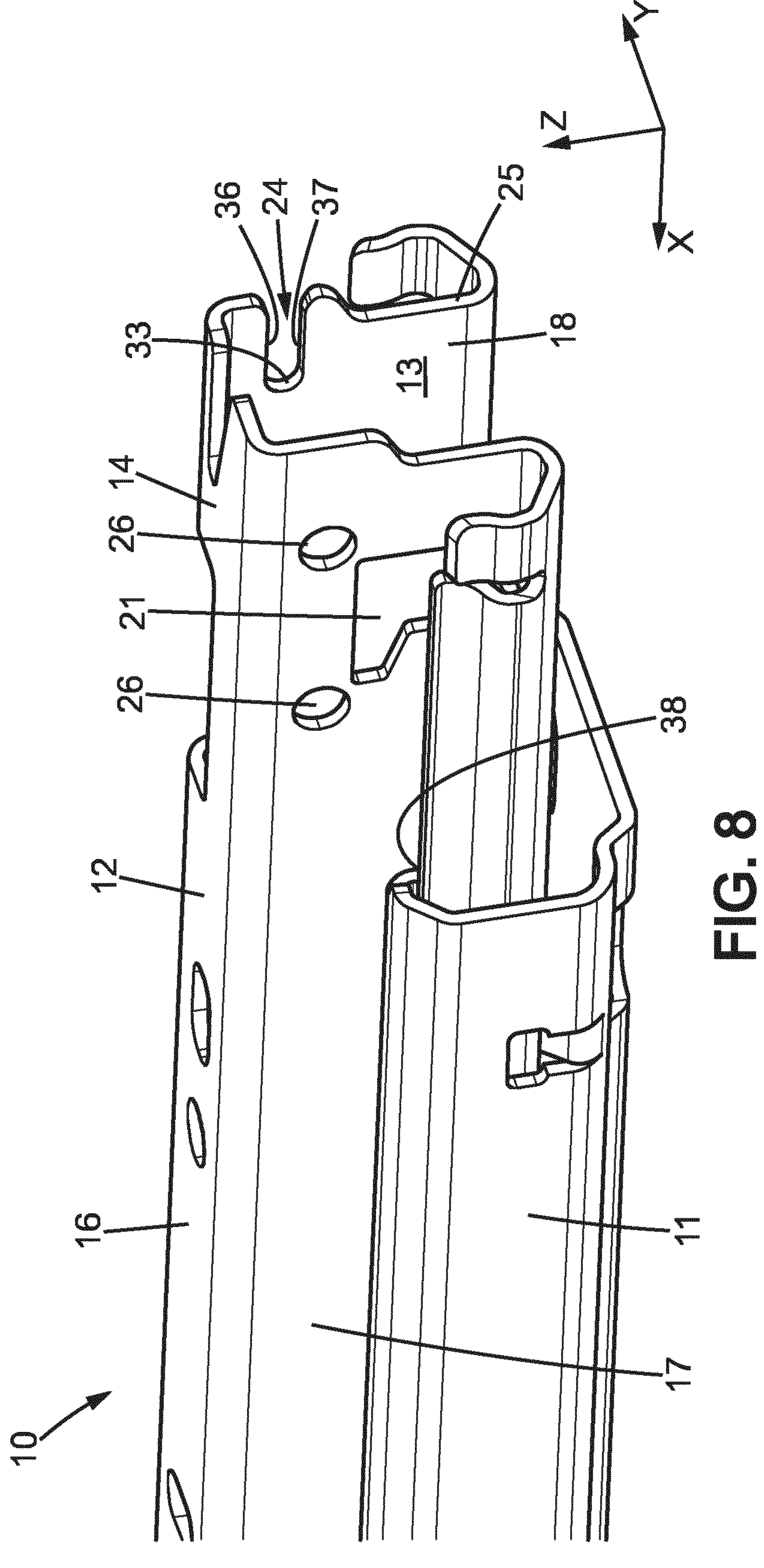
FIG. 8 is a perspective view of the runner laterally opposite the view of FIG. 7, without the position sensor.

As can be seen for example in FIG. 8, the male profiled section 12 comprises a first opening 21. The first opening 21 is configured for the arrangement of a position sensor 19, described later in the present description. As shown in the figures, the first opening 21 is arranged on the first side wall 17. The first opening 21 goes all the way through, i.e. it causes the internal runner space 13 to communicate with the outside of the male profiled section 12. More specifically, the first opening 21 is arranged at the rear end 14 of the male profiled section 12. For example, the first opening 21 is arranged near the edge 25.

The male profiled section 12 may further comprise a guide opening 26. The guide opening 26 goes all the way through, i.e. it causes the internal runner space 13 to communicate with the outside of the male profiled section 12. The guide opening 26 is for example circular. The guide opening 26 cooperates with a pin 27, described below. The guide opening 26 is arranged on the wall comprising the first opening 21. In the example shown in the figures, the guide opening 26 is thus arranged on the first side wall 17.

Furthermore, the guide opening 26 is positioned above the first opening 21 in the vertical direction Z. The first opening 21 is thus closer to the web 16 than the first opening 21, in the vertical direction Z. Also illustrated by the figures, the first side wall 17 comprises two guide openings 26. The two guide openings 26 are substantially aligned in the longitudinal direction X, and arranged on either side and above the first opening 21.

In reference also to FIG. 8, the male profiled section 12 further comprises a second opening 24. The second opening 24 is provided to attach thereto a fastening portion 23, described below. According to the example shown, the second opening 24 is a notch, emerging toward the rear end 14 of the male profiled section 12. The second opening 24 comprises a bottom 33, substantially oriented in the vertical direction Z, an upper notch edge 36 and a lower notch edge 37, the upper notch edge 36 and the lower notch edge 37 being positioned one above the other and perpendicular to the bottom 33, that is, along the longitudinal direction X. In other words, the second opening 24 is a cutout, or notch, in the edge 25. Due to its shape, the second opening 24 longitudinally guides the fastening portion 23 to fasten it to the male profiled section 12.

Figure 6:
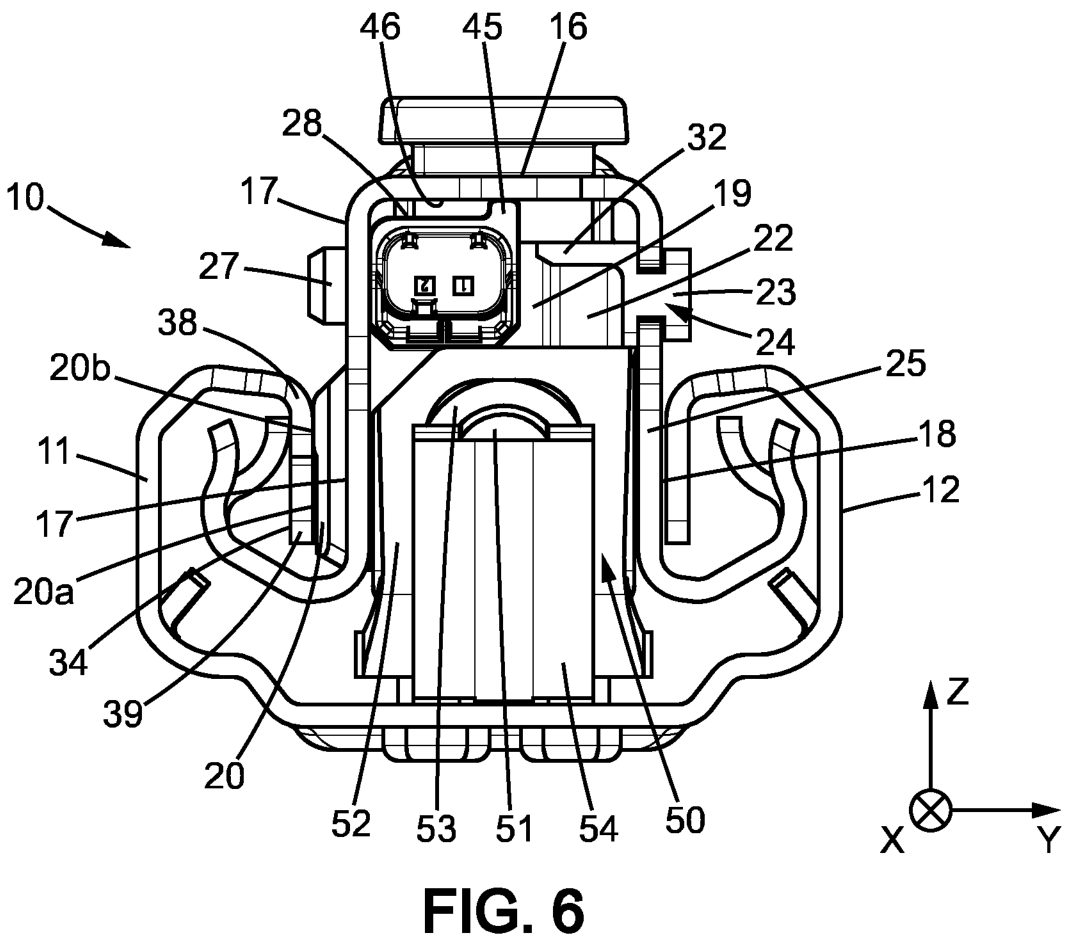
FIG. 6 is a front view of the runner, from its rear end, shown in FIG. 1, the rear end of the male profiled section being engaged in the female profiled section.
Figure 9:
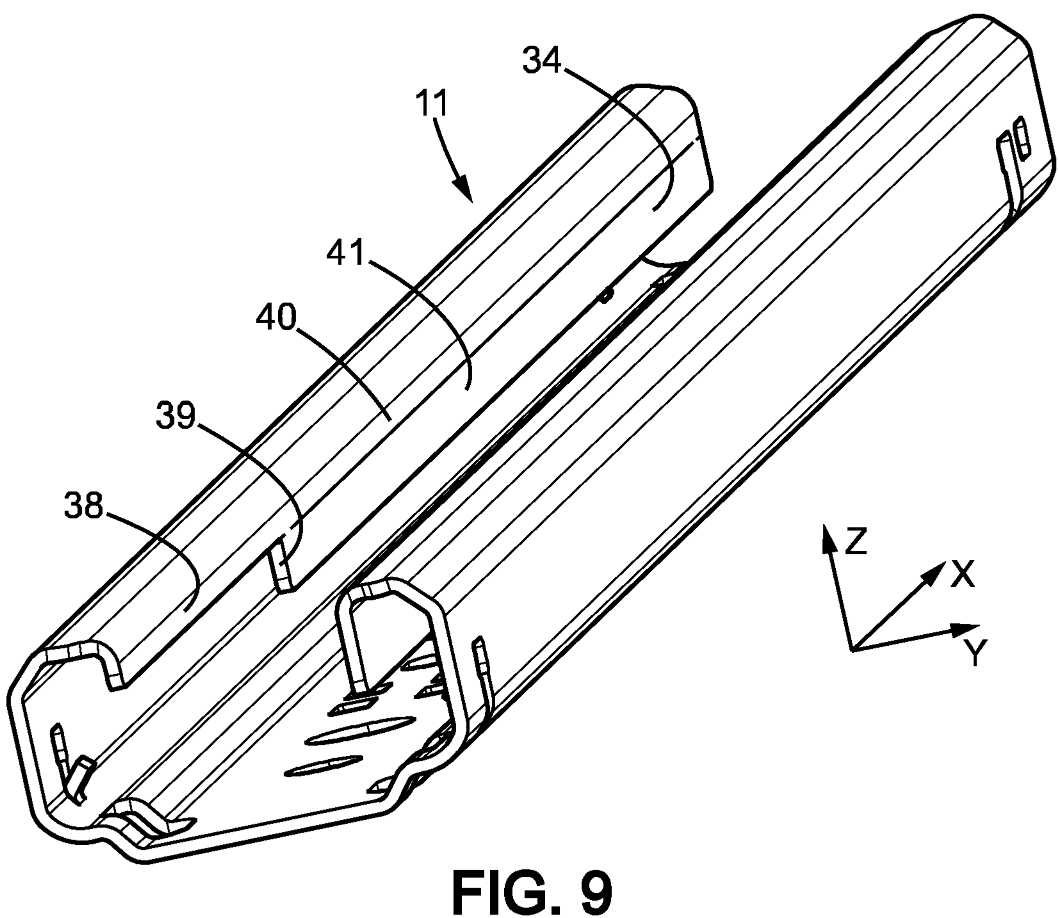
FIG. 9 is a perspective view from its rear end, of the female profiled section of the runner.

As shown in the figures, and in particular as seen in FIGS. 6 and 9, the female profiled section 11 may comprise a substantially planar wall 34. The substantially planar wall 34 extends substantially parallel to the first side wall 17. The substantially planar wall 34 and the first side wall 17 are not in contact with each other, a space being left free between the substantially planar wall 34 of the female profiled section 11 and the first side wall 17.

Furthermore, the substantially planar wall 34 comprises a rear portion 38 and a front portion, said front portion being separated longitudinally by an upper front portion 40 and a lower front portion 41. In FIG. 9, the upper front portion 40 and the lower front portion 41 are delimited from one another by dashed lines. The rear portion 38 and the upper front portion 40 are of the same height, in the vertical direction Z. The lower front portion 41 extends downwards from the upper front portion 40. In other words, the rear portion 38 and the front portion have different heights, the height of the rear portion 38 being less than the height of the portion, i.e. the rest of the substantially planar wall 34. The rear portion 38 is adjacent to the rest of the substantially planar wall 34. The height difference between the rear portion 38 and the rest of the substantially planar wall 34 results in a step, or engagement portion 39. The substantially planar wall 34 thus comprises a first part, the rear portion 38, which extends vertically in the vertical direction Z and a second part, the front portion, which also extends vertically but lower in the vertical direction Z than the rear portion 38. The difference in height between these two parts induces the presence of the engagement portion 39.

According to the present description, the runner 10 further comprises a position sensor 19. The position sensor 19 is configured so as to determine the position of the male profiled section 12 relative to the female profiled section 11, at least in the longitudinal direction X of the runner 10. The position sensor 19 is fixed in the male profiled section 12, in particular in the internal runner space 13. As the position sensor 19 extends in the volume of the runner 10, the latter does not risk being struck by an external element, such as the foot of a user, and becoming damaged, for example, and therefore no longer operating, fulfilling its function and in particular guaranteeing the safety of an occupant of a vehicle seat attached to the floor of a vehicle via the runner 10.

Figure 10:
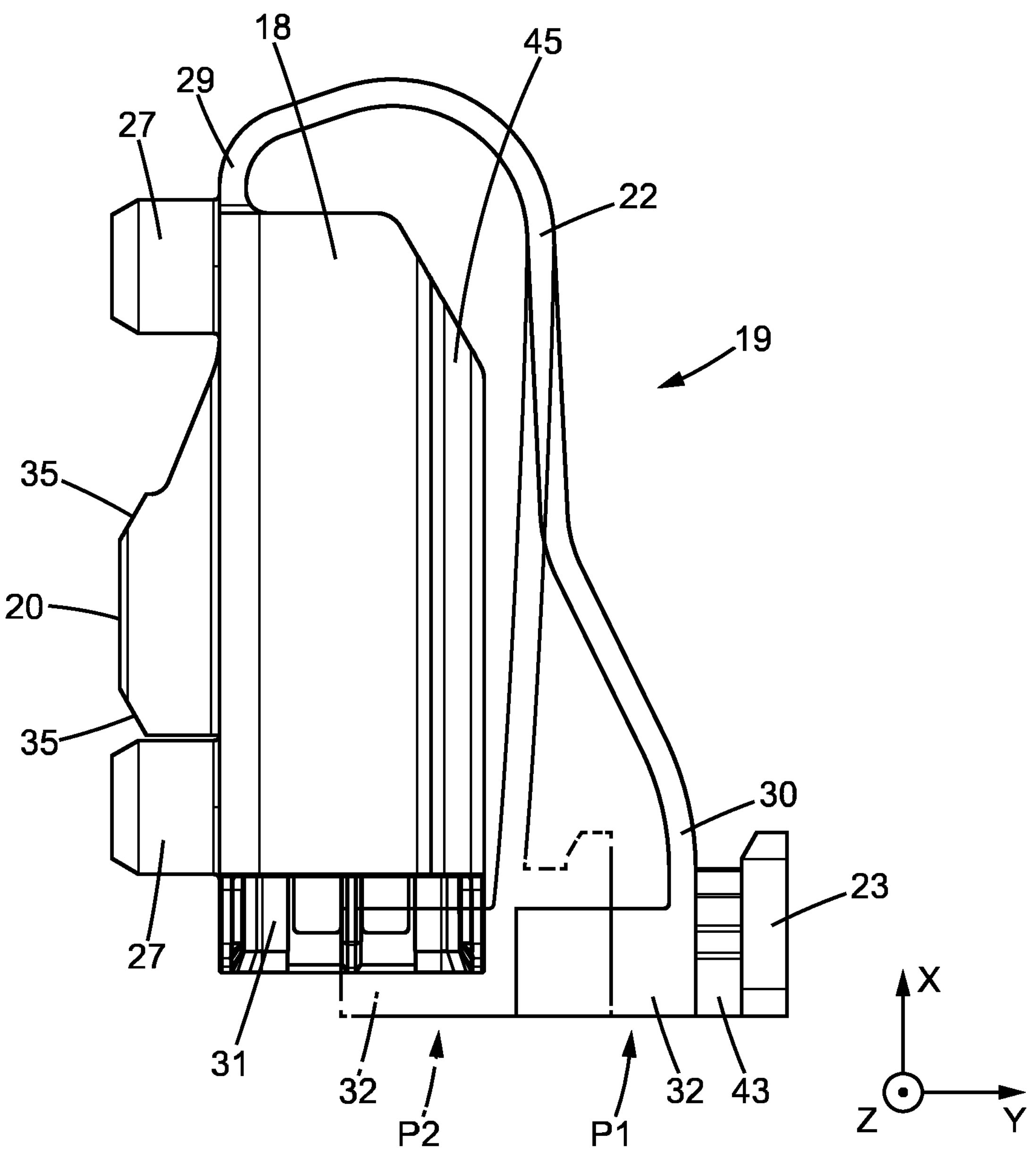
FIG. 10 is an upper view of the position sensor, according to one embodiment according to the invention.
Figure 11:
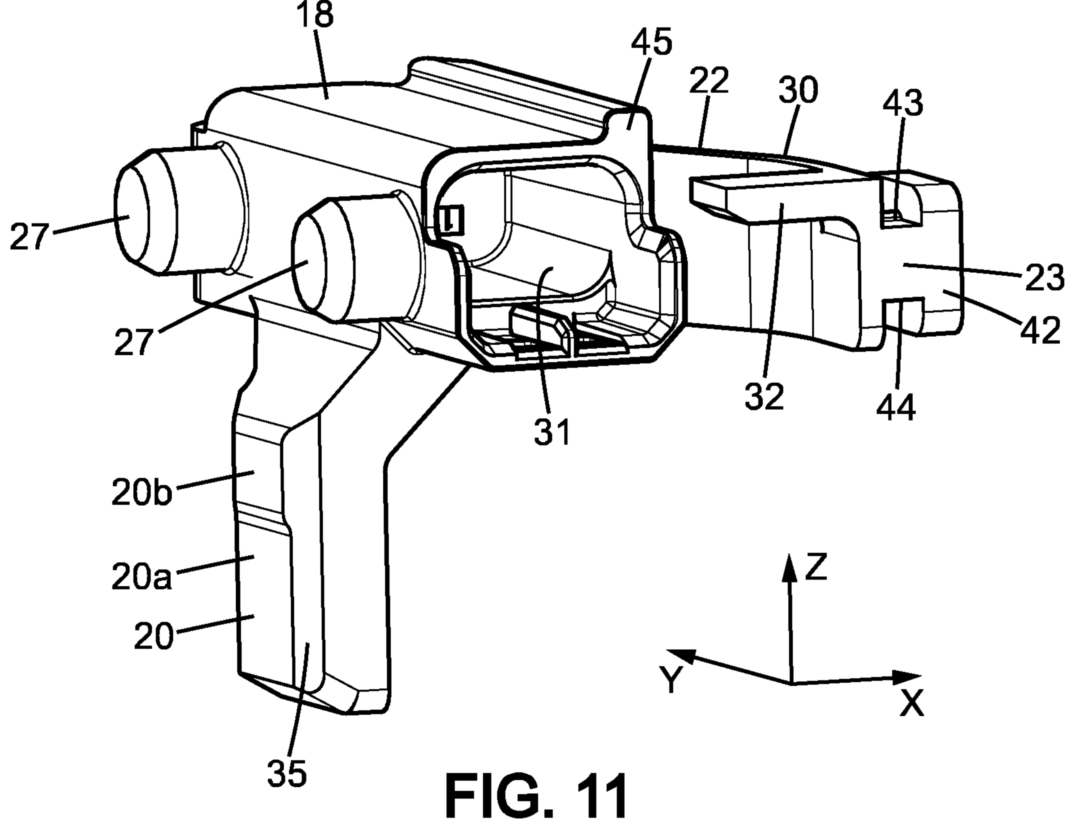
FIG. 11 is a lateral perspective view of the position sensor of FIG. 10.
Figure 12:
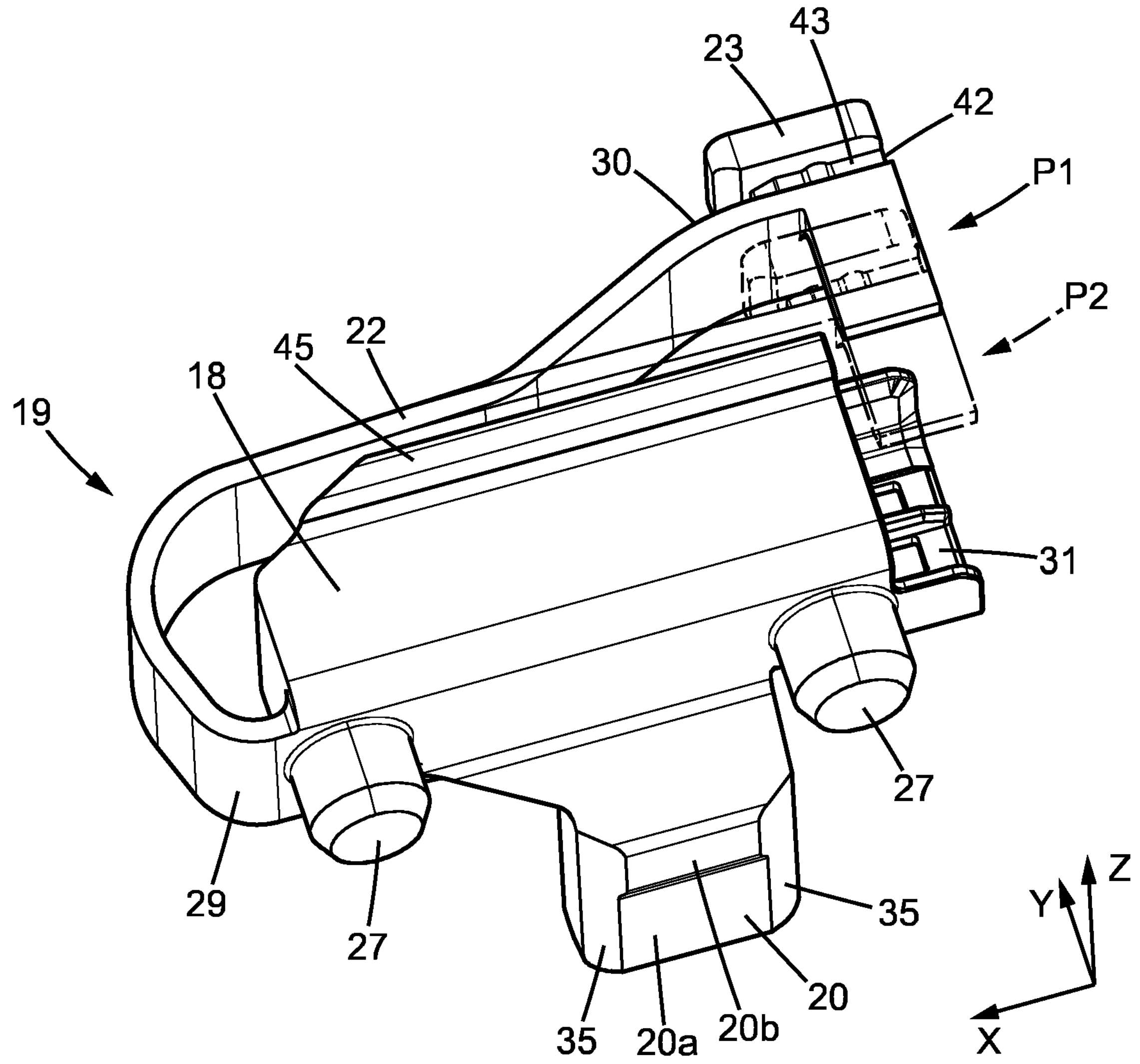
FIG. 12 is an upper lateral perspective view of the position sensor of FIG. 10.

As can be seen in the figures, and in particular FIGS. 10, 11 and 12, the position sensor 19 comprises a sensor body 28, in particular pins 27, a flexible portion 22, and a sensitive portion 20.

The sensor body 28 can advantageously be made, at least partially, of thermoplastic material. The rear end of the sensor body 28 further comprises a connection interface 31. The connection interface 31 is provided to receive one or more cables or connectors, in particular electrical cables, for their connection to the position sensor 19.

The sensitive portion 20 protrudes from the sensor body 28. In addition, the sensitive portion 20 is positioned through the first side wall 17, in the first opening 21. More specifically, the sensitive portion 20 is oriented toward the outside of the male profiled section 12, i.e. it does not face the internal runner space 13. The sensitive portion 20 passes through the first opening 21 of the first side wall 17 of the male profiled section 12 and protrudes outside the first side wall, arranged between the first side wall 17 and the substantially planar wall 34 of the female profiled section 11, and oriented toward the substantially planar wall 34, when the female profiled section 11 is opposite the first opening 21. In other words, the sensitive portion 20 extends from the sensor body 28 through the first opening 21 towards the outside of the male profiled section 12. As can be seen for example in the Figures, the sensor body 28 extends mainly and substantially in the longitudinal direction, while the sensitive portion 20 protrudes from the sensor body 28, perpendicular to the sensor body 28, that is in the transverse direction Y.

Figure 1:
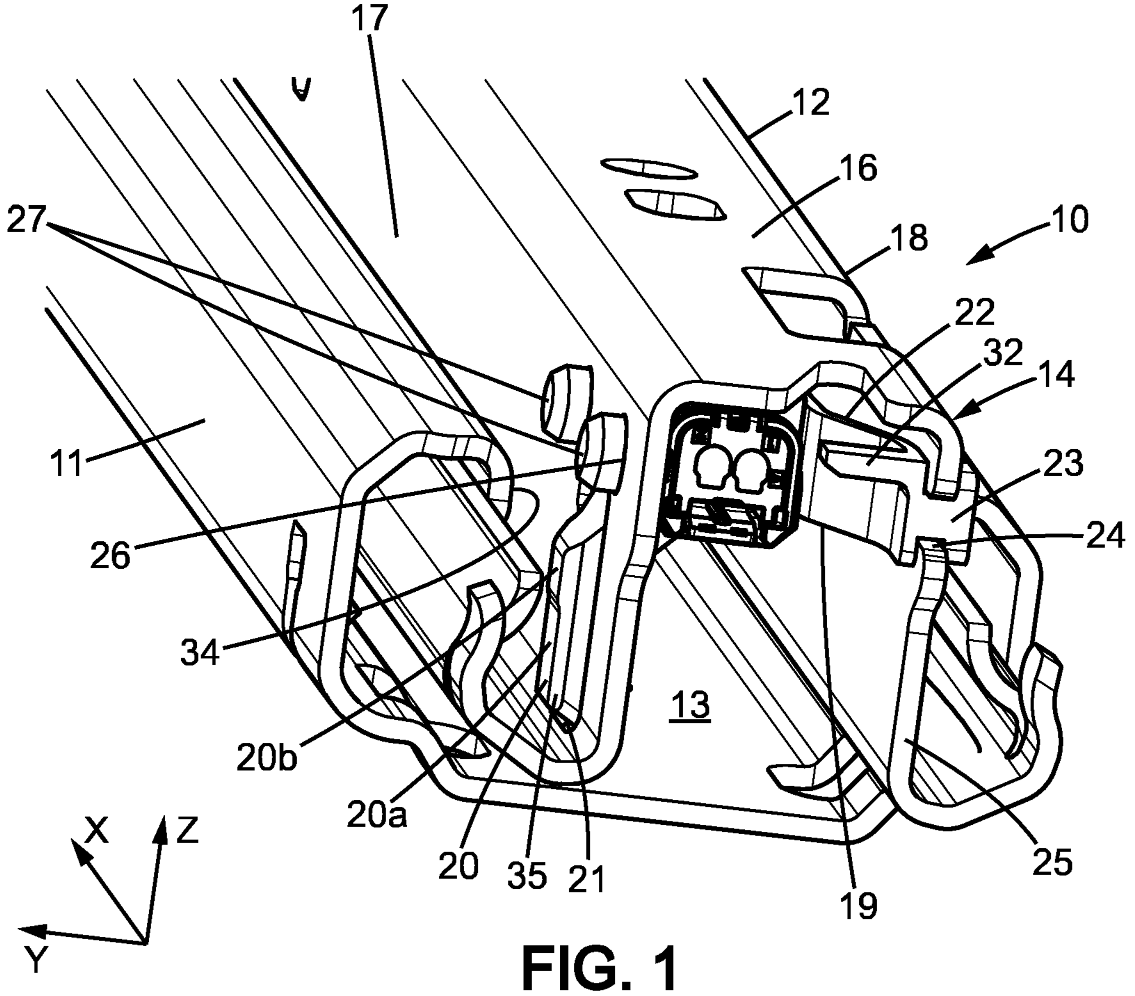
FIG. 1 is a perspective and lateral view of a runner comprising a position sensor, from its rear end, according to one embodiment according to the invention, the rear end of the male profiled section being set back relative to the female profiled section.
Figure 3:
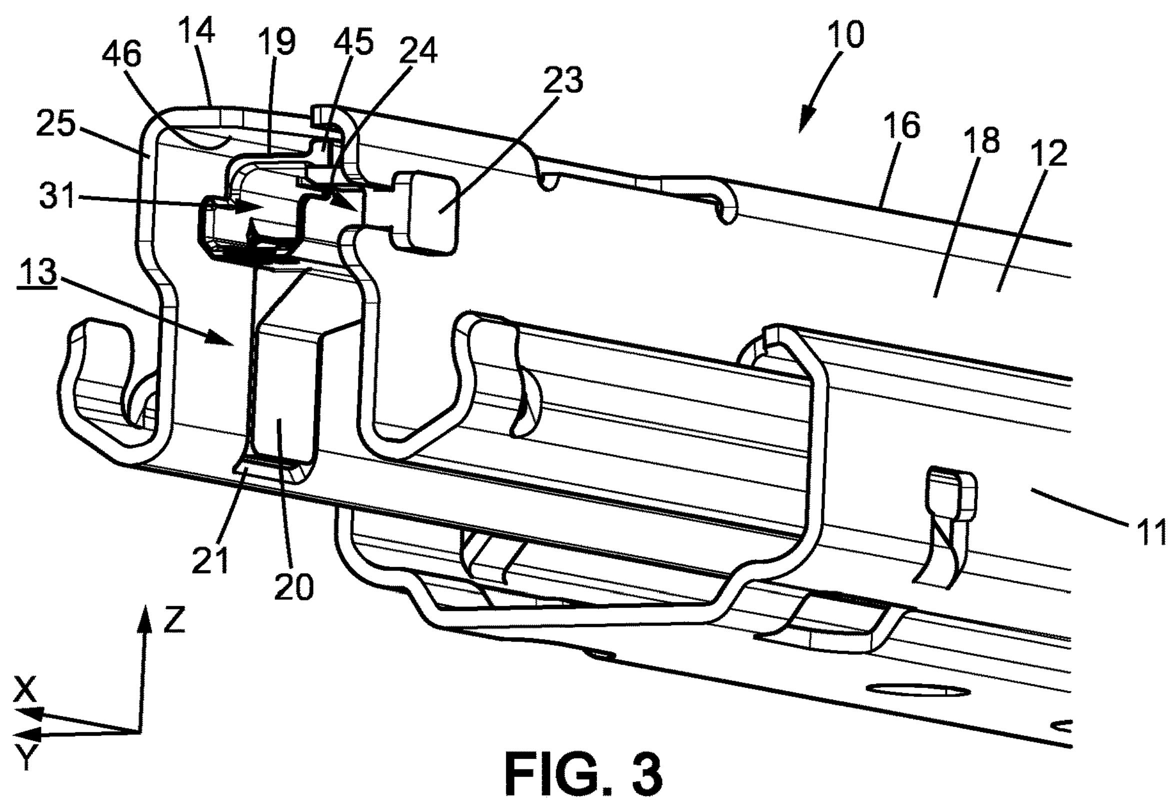
FIG. 3 is a perspective view laterally opposite the runner of FIG. 2.

The sensitive portion 20 is movable between a deployed position and a retracted position. In its retracted position, illustrated for example in FIGS. 6 and 7, the sensitive portion 20 is in contact with the female profiled section 11, and in particular with the upper front portion 40 and the rear portion 28 which faces the first opening 21. More precisely, the sensitive portion 20 may be configured to be in contact with the upper front portion 40 of the substantially planar wall 34 and the rear portion 38. In its deployed position, illustrated for example in FIGS. 1, 2, 3, the sensitive portion 20 is not in contact with the substantially planar wall 34 of the profile. In this position, the sensitive portion 20 is arranged farther toward the outside of the male profiled section 12 in the transverse direction Y than in the retracted position.

The sensitive portion 20 is provided to comprise a means for detecting and measuring the male profiled section 12 relative to the female profiled section 11. This detection and measurement means may for example measure the surrounding magnetic field of the female profiled section 11 and be able to deduce therefrom the position along the longitudinal direction X of the male profiled section 12 relative to the female profiled section 11.

To this end, when the male profiled section 12 is arranged set back from the female profiled section 11, namely the sensitive portion 20 is not facing the female profiled section 11, as can be seen in FIG. 2, the position sensor 19 does not detect the female profiled section 11. When the male profiled section 12 is engaged in the female profiled section 11, the latter can be arranged in a first position or a second position. A first position corresponds to the male profiled section 12 being engaged in the female profiled section 11, the sensitive portion 20 of the sensor bearing against the rear portion 38, at the upper portion of the substantially planar wall 34, a detecting part **20*a* of the sensitive portion 20 extending downwards below the rear portion 38 so that the substantially planar wall 34 is not detected by the position sensor 19. In fact, in this first position, only the rear portion 38 of the substantially planar wall 34 is facing the first lateral first wall 17, at the position sensor 19. If the male profiled section 12 continues its longitudinal movement into the female profiled section 11, the male profiled section 12 is then in a second position. In the second position, illustrated for example in FIG. 5, the position sensor 19 is facing the lower front portion 41 of the substantially planar wall 34 of the female profiled section 11. In this second position, the detecting portion 20 a of the sensitive portion 20 is facing the lower front portion 41 and detects the substantially planar wall 34, and in particular the lower front portion 41**.

The sensitive portion 20 may also comprise a cam part **20*b* which can always bear against the female profiled section 11 as long as the sensitive portion 20 of the position sensor 19 is engaged in the female profiled section 11**.

In general, the sensitive portion 20 can thus comprise:

- the upper cam part **20*b*, intended to be in contact with the substantially planar wall 34 of the female profiled section 11 configured by bearing on the rear portion 38, then on the upper front portion 40 when the male profiled section 12** slides forward,
- the detection part **20*a* of the sensitive portion 20, which extends below the cam part 20*b***.

It will be noted that the cam part **20*b* can protrude outwardly, along the transverse direction, relative to an exterior surface of the detection part 20*a* so that there always exists an air gap, for example less than 1 mm, between the detection part 20*a* of the sensitive portion 20 and the lower front portion 41 of the female profiled section 11, even when the sensitive portion 20 bears via its cam part 20*b* on the upper front portion 40**.

Alternatively or additionally, the position sensor 19 may comprise a mechanical switch, configured to be opened, or respectively closed, as a function of the position of the male profiled section 12 relative to the female profiled section 11 in the longitudinal direction X of the runner 10, by being actuated by the substantially planar wall 34 of the female profiled section 11, or an optical switch, configured to be open, or respectively closed, as a function of the position of the male profiled section 12 relative to the female profiled section 11 in the longitudinal direction X of the runner 10, by emitting an optical signal provided to be reflected or not by the substantially planar wall 34 of the female profiled section 11.

Furthermore, as seen for example in FIG. 12, the sensitive portion 20 may comprise a chamfer 35 on both sides. The chamfer 35 is particularly advantageous for a gentle transition between the deployed position and the retracted position of sensitive portion 20, when the position sensor 19 goes into the female profiled section 11, or vice versa when the position sensor 19 emerges from the female profiled section 11. In other words, the chamfer 35 limits the impacts experienced by the contact between the sensitive portion 20 and the engagement portion 39.

Positioning the sensitive portion 20 on the first side wall 17 of the male profiled section 12 is particularly advantageous, in that such a first side wall 17 is generally close to the substantially planar wall 34 of the female profiled section 11. Therefore, the sensitive portion 20 is closest to said substantially planar wall 34 of the female profiled section 11, and can easily measure the magnetic field or its variation in the vicinity of the female profiled section 11, without an interfering element being able to become lodged between the first side wall 17 of the male profiled section 12 and the substantially planar wall 34 of the female profiled section 11. In addition, this also makes it possible to use a means for measuring the magnetic field of reduced dimensions, in order to limit the bulk of the position sensor 19 and to reduce the cost of the runner 10.

According to one embodiment, the flexible portion 22 of the position sensor 19 is shown in FIGS. 10, 11 and 12. The flexible portion 22 is configured to resiliently stress the sensitive portion 20 through the first opening 21 outwardly. The flexible portion 22 is thus configured so as to maintain the sensitive portion 20 attached against the lower front portion 41 of the substantially planar wall 34, substantially in the transverse direction Y of the runner 10.

By virtue of this advantageous arrangement, the sensitive portion 20 is positioned as close as possible to the substantially planar wall 34 of the female profiled section 11. Furthermore, the flexible portion 22 is configured so as to urge the position sensor 19 into position in the direction of the substantially planar wall 34 of the female profiled section 11 in the transverse direction Y of the runner 10, in order to maintain a constant difference, and in particular zero, between the sensitive portion 20 and the lower front portion 41 of the female profiled section 11 in the transverse direction Y of the runner 10.

The flexible portion 22 is for example an elastic blade, as shown in the figures. The flexible portion 22 may furthermore be a spring or any other element comprising flexibility in accordance with the present disclosure, such as for example an elastomeric buffer. The flexible portion 22 may also for example be made of plastic material, and can easily be made of thermoplastic material by injection molding, or metal.

The flexible portion 22 comprises a first flexible portion end 29 and a second flexible portion end 30. The first flexible portion end 29 is attached to the sensor body 28. The second end of the flexible portion 30 is free, and comprises a fastening portion 23. The fastening portion 23 is configured to engage in the second opening 24 of the second side wall 18. It is thus understood that the position sensor 19 bears both against the first side wall 17 and against the second side wall 18.

In particular, as can be seen in FIGS. 10, 11 and 12, the fastening portion 23 comprises, for its attachment to the second side wall 18, a fastening portion body 42. In a rear view, such as that shown in FIG. 4 or 6, the fastening portion 23 has the shape of an H, extending longitudinally, along the longitudinal direction X, the fastening portion body 42 representing the central bar of the H. The fastening portion body 42 is delimited by a first upper groove 43 and a second lower groove 44. The first groove 43 is configured to cooperate with the upper notch edge 36. The second groove 44 is configured to cooperate with the lower notch edge 37. The fastening portion 23, in particular the fastening portion body 42, is continued in the transverse direction Y by a button portion 47. The button portion 47 is of greater dimension than the fastening portion body 42 so that said button portion 47 holds the fastening portion 23 in position in the second opening 24, at least by blocking the transverse movement of the fastening portion 23.

By virtue of this advantageous arrangement, and in particular by virtue of the first groove 43 and the second groove 44 cooperating respectively with the upper notch edge 36 and the lower notch edge 37, the position sensor 19 is guided longitudinally during its assembly with the male profiled section 12, as described below, by respective sliding of the upper notch edge 36 and of the lower notch edge 37 in the first and second groove 43, 44.

The fastening portion 23 further comprises an obstruction portion 32. The obstruction portion 32 is arranged opposite the fastening portion body 42 in the transverse direction Y.

Furthermore, as shown and diagrammed in the figures runner 10 and male profiled section 12, the fastening portion 23 is movable between a fastened position P1 and an insertion position P2. In the fastened position P1, the fastening portion 23 is farther from or moved away from the sensor body 28 in the transverse direction Y than in the insertion position P2. The fastened position P1 corresponds to the position of the fastening portion 23 once inserted and attached into the male profiled section 12. The insertion position P2 corresponds to a working position for inserting the position sensor 19 into the male profiled section 12. In normal condition of use of the position sensor 19, that is, when it is inserted into the runner 10 to detect the position of the male profiled section 12 relative to the female profiled section 11, only the fastened position P1 is possible, the fastening portion 23 being fastened in the second opening 24 at the time.

Between the fastened position P1 and the insertion position P2, the fastening portion 23 can move transversely, in the transverse direction Y. This is possible thanks to the flexible portion 22. The insertion position P2 is shown in dashed lines in FIGS. 10 and 12. In the insertion position P2, the obstruction portion 32 is arranged in line with the connection interface 31, in the longitudinal direction X. In other words, the obstruction portion 32 is aligned with the connection interface 31, in the longitudinal direction X. In this position, it is impossible to connect a connector or cable to the position sensor 19, the connection interface 31 being obstructed by the obstruction portion 32. The fastening portion 23 thus forms an obstacle preventing the connection of the cables to the connection interface 31. It will thus be understood that the obstruction portion 32 is a foolproofing mechanism, making it possible to indicate poor placement of the position sensor 19 in the male profiled section 12. This is for example the case when the fastening portion 23 is not engaged in the second opening 24, or when the sensitive portion 20 is not engaged in the first opening 21. In other words, the fastening portion 23 releases the sensor body 28 in the transverse direction Y in the fastened position P1.

The sensor body 28 further comprises a protrusion 45. This protrusion 45 is visible for example in FIGS. 3, 4, 6, 7, and 10, 11 and 12. The protrusion 45 is a portion of material on the upper face of the sensor body 28. According to the example shown in the figures, the protrusion 45 takes the form of a portion that extends over the entire length of the sensor body 28, in the longitudinal direction X. Another shape may however be envisaged, such as for example one or more studs. The protrusion 45 is directed toward the lower face 46 of the web 16. Furthermore, the protrusion 45 comes into contact with the lower face 46 of the web 16. Advantageously, the protrusion 45 opposes the tilting of the sensor body 28, when the sensitive portion 20 passes from the deployed position to the retracted position. In other words, the protrusion 45 holds the sensor body 28 in position in the internal runner space 13 and opposes the pivot movement of the position sensor 19 about the longitudinal axis when the sensitive portion 20 (and more particularly its cam part 20*b*) is in contact with the female profiled section 11.

Furthermore, the sensor body 28 comprises at least one pin 27. In the example shown in the figures, the sensor body 28 comprises two pins 27. However, without departing from the field of the present disclosure, the sensor body 28 may comprise for example three, or four pins 27. Each pin 27 is received in a guide opening 26. Each pin 27 is arranged above the sensitive portion 20, in the vertical direction Z. Each pin 27 is of sufficient length to block the longitudinal movement of the position sensor 19 in the runner volume 13 over the entire transverse stroke of the position sensor 19 between the deployed position and the retracted position of the sensitive portion 20. In other words, the pins 27 maintain the longitudinal position of the position sensor 19 in the internal runner space 13, regardless of the position of the male profiled section 12 in the female profiled section 11.

Figure 4:
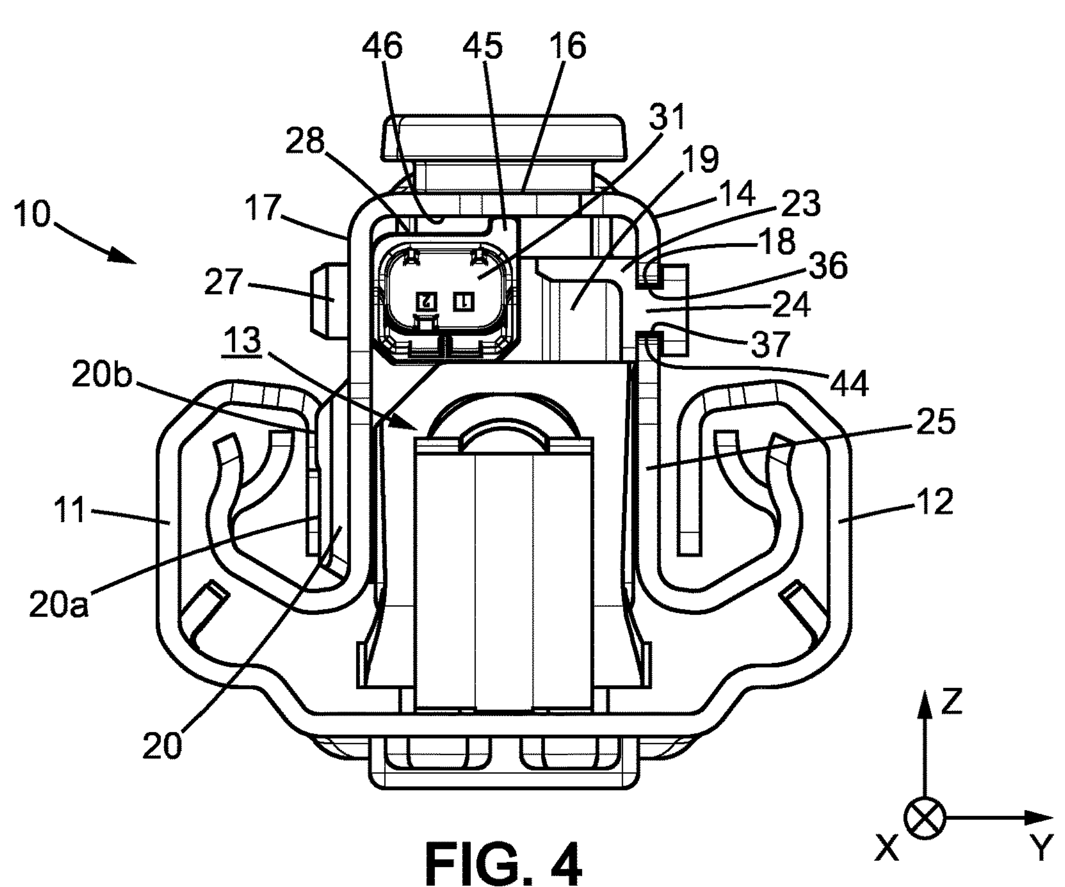
FIG. 4 is a front view of the runner, from its rear end, shown in FIG. 1, the rear end of the male profiled section being set back relative to the female profiled section.
Figure 7:
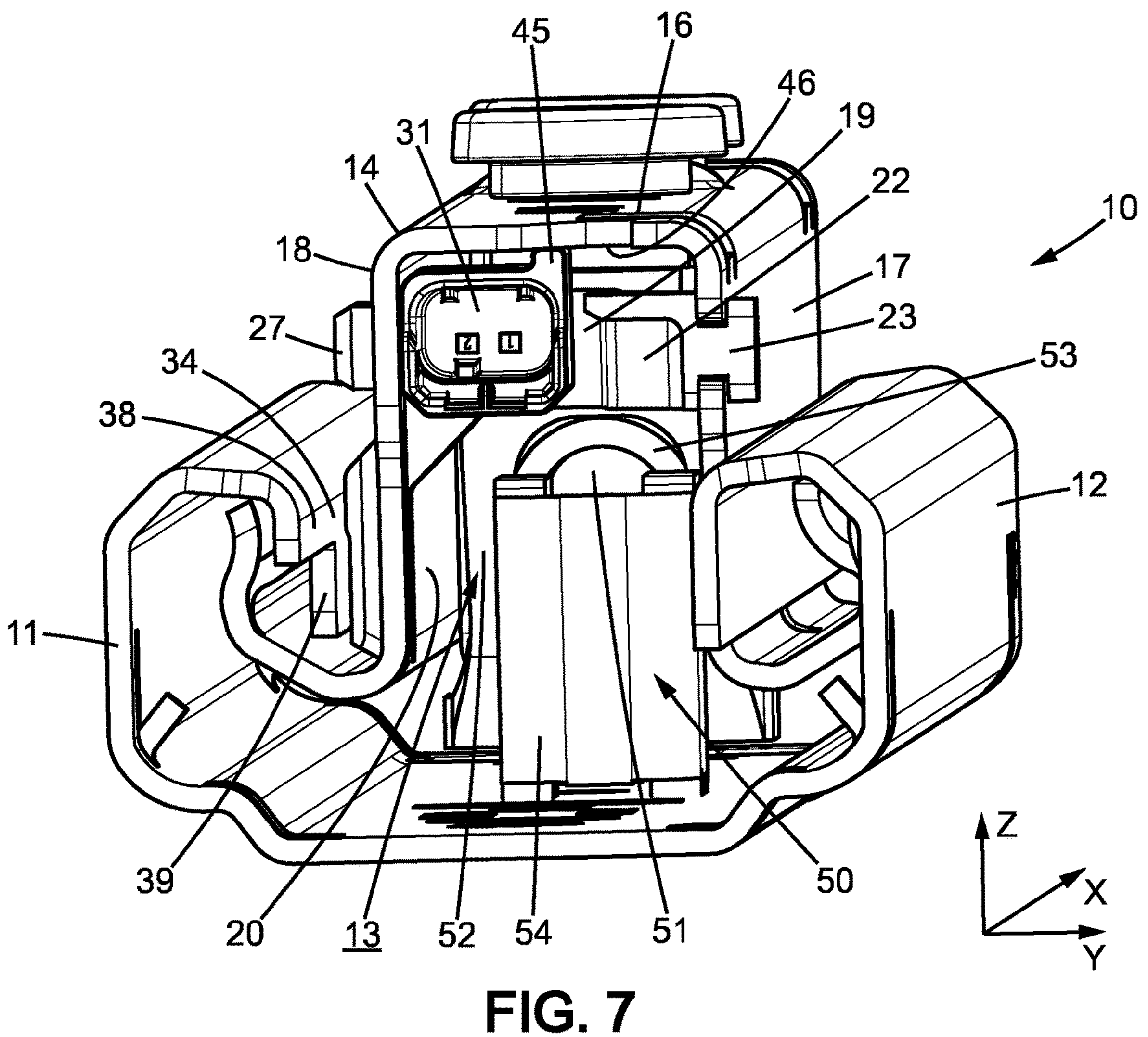
FIG. 7 is a lateral perspective view of the runner of FIG. 6.

According to the example shown in FIGS. 4, 6 and 7, the runner 10 comprises a screw adjustment mechanism 50. The screw adjustment mechanism 50 comprises a screw 51 and a casing 52. The screw 51 extends into the internal runner space 13, and is oriented in the longitudinal direction X. The screw 51 is further secured to the female profiled section 11, by a support 54, and typically two supports 51 at the ends of the screw. The casing 52 is integral with the male profiled section 12, and houses a nut 53 screwed onto the screw 51, the nut 53 being mounted to rotate relative to the casing 52.

The arrangement of the position sensor 19 in the internal runner space 13 is further particularly advantageous in the case where the runner 10 comprises the screw adjustment mechanism 50. Indeed, the screw adjustment mechanism 50 occupies a majority of the internal runner space 13. The position sensor 19 is arranged above the screw adjustment mechanism 50, in particular pressed against the lower face 46 of the web 16, so as to leave free the rest of the internal runner space 13 for the passage of the support(s) 54 under the position sensor 19 during the sliding of the male profiled section 12 within the female profiled section 11. Thus, in FIG. 4 or 7, and in general, it can be seen that the sensor body 28, the flexible portion 22 and the fastening portion 32, extend in an upper interspace above the support 54 and the screw, while the sensitive portion 20, which protrudes below the sensor body 28 extends laterally to the screw and to the support 54.

Thus, the position sensor 19 can be used in any type of runner, while being protected from the outside.

Furthermore, since the position sensor 19 is attached to the male profiled section 12, and is not dependent on additional elements for the detection of the female profiled section 11, it can easily be envisaged to provide a runner 10, already equipped with the position sensor 19 before mounting a seat on the floor of a vehicle. Once the runner 10 is attached to the floor and the seat, the last step, in order to make the detection of the seat position functional, then consists merely and solely of connecting the position sensor 19 via its connection interface 31.

The invention also relates to a method for manufacturing a runner 10 in accordance with the description given above. The method mainly consists of:

a) providing the position sensor 19, the fastening portion 23 being in the insertion position P2, b) assembling the position sensor 19 to the runner 10 by a longitudinal assembly. During this longitudinal assembly, the position sensor 19 is inserted into the internal runner space 13 by the rear end 14 of the male profiled section 12, in the longitudinal direction to the runner 10 through the inverted U-shaped opening delimited by the edge 25 of the male profiled section 12 to secure the position sensor 19 inside the male profiled section 12 until the sensitive portion 20 is engaged in the first opening 21 and the fastening portion 23 in the second opening 24.

Furthermore, during b), for the insertion of the position sensor 19 into the internal runner space 13, the fastening portion 23 is moved into an intermediate position between the insertion position P2 and the fastened position P1 while engaging the fastening portion 23 in the second opening 24. During this step, the fastening portion 23 is engaged in the second opening second opening 24, with longitudinal guiding, in particular by contact between the upper notch edge 36 and the lower notch edge 37 with the first groove 43 and the second groove 44.

LIST OF REFERENCE SIGNS

10. Slide
11. female profiled section
12. male profiled section
13. internal runner space
14. rear end
15. front end
16. web
17. first side wall
18. second side wall
19. position sensor
20. sensitive portion
20. detection part
20*b*. cam part
21. first opening
22. flexible portion
23. fastening portion
24. second opening
25. edge
26. guide opening
27. pin
28. sensor body
29. first flexible portion end
30. second flexible portion end
31. connection interface
32. obstruction portion
33. bottom

34. substantially planar wall
35. chamfer
36. upper notch edge 36
37. lower notch edge 37
38. rear portion
39. engagement portion
40. Upper front portion
41. Lower front portion
42. fastening portion body
43. first groove
44. second groove
45. protrusion
46. lower face
47. button portion
50. screw adjustment mechanism
51. screw
52. casing
53. nut
54. support
X. longitudinal direction
Y. transverse direction
Z. vertical direction
P1. Fastening position
P2. Insertion position

The invention claimed is:

1. A runner for a vehicle seat, the runner extending mainly in a longitudinal direction, and comprising:

a female profiled section configured to be fixed to a vehicle floor, a male profiled section mounted to slide with respect to the female profiled section in the longitudinal direction, an internal runner space being delimited between the male profiled section and the female profiled section, the male profiled section comprising, in the longitudinal direction, a first end, and a second end, and having a web and first and second side walls, the web extending longitudinally substantially in the longitudinal direction and transversely in the transverse direction, said web being continued downwards by the first and second side walls, a position sensor, attached to the male profiled section, in the internal runner space, and configured so as to determine the position of the male profiled section with respect to the female profiled section, at least in the longitudinal direction of the runner, the position sensor comprising a sensor body and a sensitive portion extending projecting from the sensor body, the sensitive portion being arranged through a first opening of a first one of the first and second side walls, the position sensor further comprising a flexible portion with a fastening portion for fastening the flexible portion to the male profiled section, the flexible portion being configured to elastically stress the sensitive portion through the first opening towards the outside in a deployed position of the sensitive portion when the female profiled section is not opposite the first opening, said sensitive portion being configured to come into contact with the female profiled section by causing its retraction toward the internal runner space in a retracted position, the fastening portion being configured to fasten in a second opening arranged on a second wall of the first and second side walls, opposite the first wall having the first opening, the position sensor being configured to be joined to the runner by longitudinal assembly, during which the position sensor is inserted into the internal runner space via one of the first and second ends of the male profiled section.

2. The runner according to claim 1, wherein the male profiled section comprises an inverted U-shaped mouth delimited by a field of the male profiled section, the position sensor being inserted into the internal runner space in the longitudinal direction to the runner through the opening to secure the position sensor inside the male profiled section until the sensitive portion is engaged in the first opening and the fastening portion in the second opening.

3. The runner according to claim 1, wherein the sensor body extends mainly and substantially in the longitudinal direction and the sensitive portion protrudes from the sensor body in the transverse direction.

4. The runner according to claim 1, wherein the second opening is a notch opening onto the field of the male profiled section having an upper notch edge and a lower notch edge, and wherein the fastening portion comprises a fastening portion body with a first groove and a second, opposite groove configured to cooperate respectively with the upper notch edge and the lower notch edge by guiding the longitudinal assembly.

5. The runner according to claim 1, the first one of the first and second side walls furthermore having at least one guide opening, wherein the position sensor comprises at least one pin cooperating with the second opening, to block the longitudinal movement of the position sensor in the runner space over the entire transverse stroke of the position sensor between the deployed position and the retracted position of the sensitive portion.

6. The runner according to claim 1, on the one hand, the sensor body having a connection interface provided to receive one or more cables for their connection to the position sensor and, on the other hand, the flexible portion may comprise a first flexible portion end and a second flexible portion end, the first flexible portion end being attached to the sensor body and comprising at its second flexible portion end the fastening portion, wherein the fastening portion is movable between an insertion position wherein the fastening portion is arranged in line with the connection interface of the sensor body along the transverse direction, and a fastening position wherein the fastening portion is moved away from the sensor body in the transverse direction, and configured so that the fastening portion forms an obstacle preventing the connection of the cables to the connection interface in the case where the position sensor is inserted into the internal runner space without the fastening portion engaging in the second opening and/or without the sensitive portion engaging in the first opening.

7. The runner according to claim 1, the sensor body comprises a protrusion, directed toward a lower face of the web of the male profiled section, configured to cooperate with the lower face by opposing the tilting of the sensor body induced by the sensitive portion coming into contact with the female profiled section.

8. The runner according to claim 1, comprising a screw adjustment mechanism comprising:

a screw extending into the internal runner space oriented in the longitudinal direction, integral with the female profiled section, a casing integral with the male profiled section, housing a nut screwed onto the screw, the nut being mounted to rotate relative to the casing, wherein the position sensor is arranged against a lower face of the web and over the screw adjustment mechanism to allow the sliding of the male profiled section in the female profiled section, without the screw adjustment mechanism coming into contact with the position sensor.

9. The runner according to claim 8, wherein the screw is integral with the female profiled section via at least one support, with a bulk greater than the bulk of the screw, the position sensor being configured to pass over the support during the sliding of the male profiled section relative to the female profiled section.

10. A method for manufacturing the runner according to claim 1, comprising:

a) providing the position sensor, b) inserting the position sensor into the internal runner space by one of the first or second ends of the male profiled section, in the longitudinal direction of the runner through an inverted U-shaped mouth delimited by a field of the male profiled section to attach it to the inside of the male profiled section until the sensitive portion is engaged in the first opening and the fastening portion is engaged in the second opening.

11. The manufacturing method according to claim 10, wherein the second end of the male profiled section terminates in a free end, and the second opening is a notch opening onto the edge of the male profiled section, comprising during b):

engaging the fastening portion with guidance of the fastening portion in the notch during the insertion of the position sensor in the longitudinal direction.

12. A vehicle seat comprising the runner according to claim 1.

* * * * *